July 3, 1951
A. G. PLIMMER
2,559,089
PATTERN CONTROLLED MACHINE TOOL
Filed Sept. 11, 1947
2 Sheets-Sheet 1
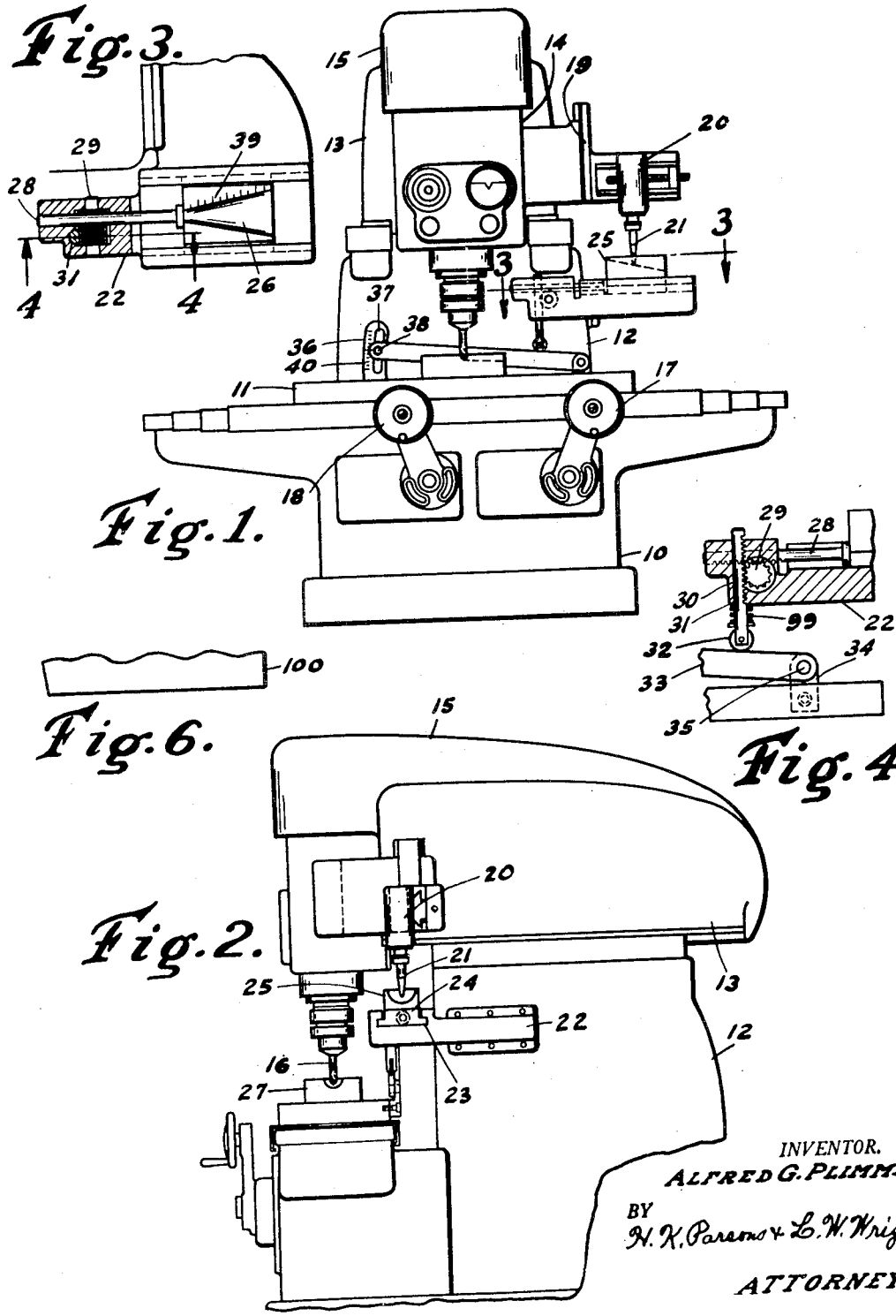
INVENTOR.
ALFRED G. PLIMMER
BY N. K. Parsons & L. W. Wright
ATTORNEYS

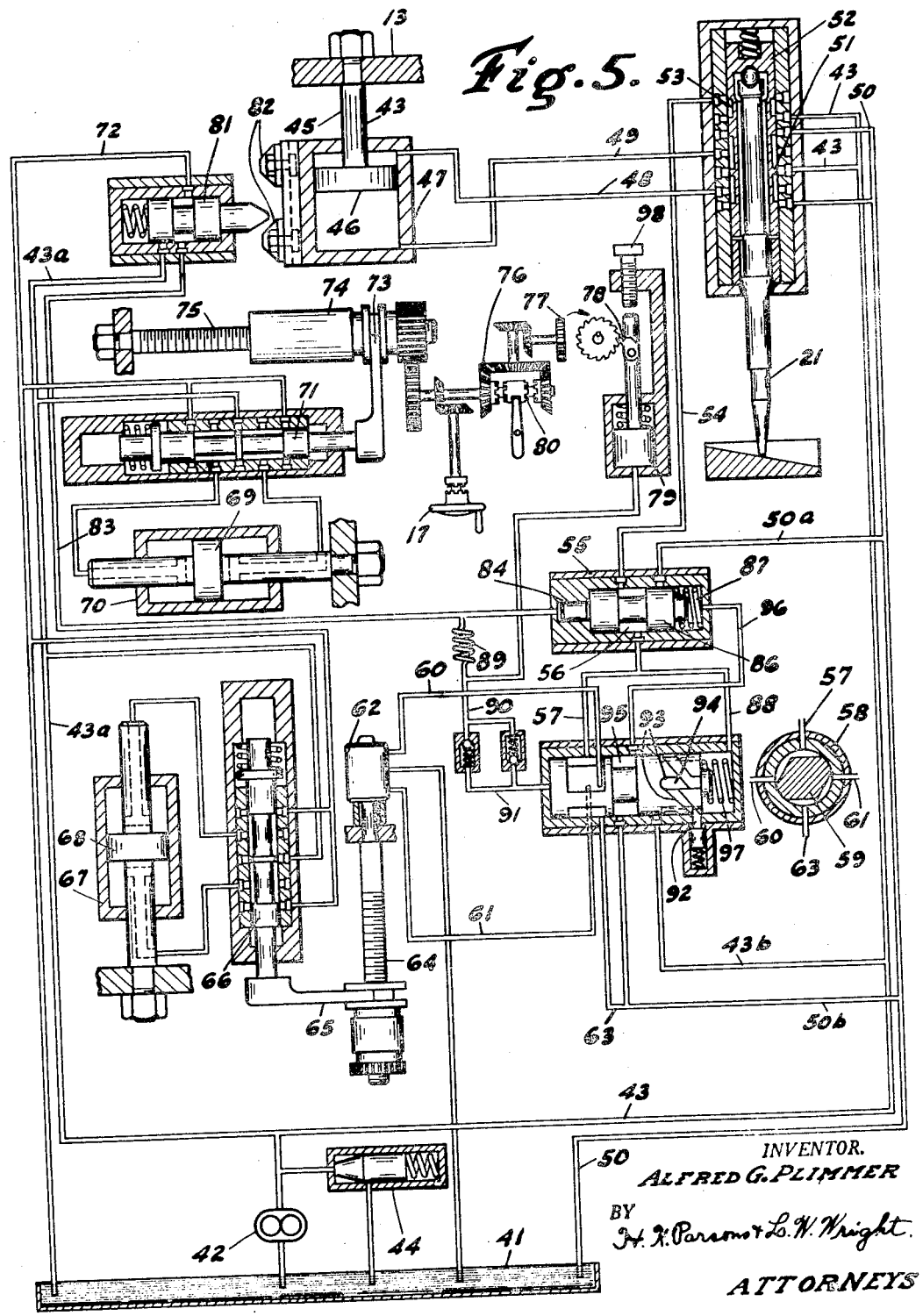

Patented July 3, 1951

2,559,089

UNITED STATES PATENT OFFICE 2,559,089

PATTERN CONTROLLED MACHINE TOOL

Alfred G. Plimmer, Cincinnati, Ohio, assignor to The Cincinnati Milling Machine Co., Cincinnati, Ohio, a corporation of Ohio Application September 11, 1947, Serial No. 773,433

3 Claims. (Cl. 90—13.5)

This invention relates to improvements in machine tools and has particular reference to a machine adapted for the formation of contoured work pieces.

One of the principal objects of the present invention is the provision of a tracer controlled machine tool structure in which varying configurations of work pieces may be produced from a single pattern.

A further object of the invention is the provision of a machine of this character in which one of the dimensional characteristics of the work piece may be varied as desired with respect to the pattern without variation in the characteristic cross-sectional formation thereof.

Another object of the invention is the provision of a machine of this character in which the complete cutting operation may be either manually or automatically controlled.

An additional object of the invention is the provision of a machine tool organization particularly adapted for the production of either concave or convex die elements or other work pieces from a pattern of given dimension in which the relationship between the longitudinal and transverse configurations of the formed work piece may be varied within wide limits as respects the fixed dimensional characteristics of the controlling pattern.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Figure 1 is a front elevation of a machine embodying these improvements.

Figure 2 is a fragmentary side elevation thereof.

Figure 3 is a fragmentary view partially in plan and partially in section as on the line 3—3 of Figure 1.

Figure 4 is a fragmentary sectional view as on the line 4—4 of Figure 3.

Figure 5 is a diagrammatic view of an automatic control system for the relatively movable machine tool parts, and Figure 6 is a view of a different form of pattern member.

The embodiment of the machine shown in Figure 1 is of the general type shown in United States Letters Patent 2,068,889 and comprises a bed portion 10 supporting a translatable table 11 and having rising therefrom a column portion 12 on which is guided the cross slide or ram member 13. This member is provided with ways as at 14, guiding for vertical movement the cutter head or slide 15 bearing the rotatable cutter 16. Longitudinal movement of table 11 on bed 10 may be effected either by power or manually by operation of the pilot wheel 17, while transverse movement of the ram 13 may be effected through suitable connections by operation of the pilot wheel 18.

Vertically adjustable on the head 15 is a bracket 19 carrying the vertically and transversely adjustable tracer housing 20 provided with the deflectable, axially movable, tracer finger 21.

Supported on the column 12 is a slide 22 having transverse ways 23 for the pattern slide 24 adapted to support the pattern or model 25 in position for engagement by the tracer finger 21. In the drawings this pattern is shown in simplified form as having a concave, conical recess 26 of uniform longitudinal taper and of semi-circular form at any cross sectional point. It will be understood, however, that both the longitudinal and transverse shapes of the pattern may be varied as desired and that the same may be of either concave or convex form, and that upon transverse or forward and back movement of ram 13 the head 15 under control of tracer 21 will move toward and from the work in accordance with the particular transverse contour line of the pattern being followed by the tracer. Inasmuch as the slide 13 and cutter bearing head have only a forward and back movement while the table 11 bearing the work piece 27 is intended to be incrementally translated or longitudinally shifted with respect to the cutter, if the pattern remains in stationary position all transverse configurations formed on the work piece by the tool will be identical.

As before mentioned, it is one of the purposes of the present invention to be able to vary automatically both the longitudinal and transverse contours produced on the work piece. To that end there is connected to slide 23 a rack bar 28 meshing with pinion 29 journaled in slide 22. There is additionally slidably mounted in the guide 30 of slide 22 a second rack bar 31 having a roller 32 adapted to travel over the upper guide face of the angularly adjustable sine bar 33. A bracket 34 secured to the table near one end thereof carries a pivot 35 for mounting one end of the sine bar. A segmental bracket or plate 36 is mounted at a more remote part of the table and formed with an arcuate slot 37 receiving the clamp stud 38 at the opposite end of the sine bar for locking the same in desired angularly adjusted position.

By reference particularly to Figures 1 and 4, it will be understood that as the table bearing the work is translated with respect to the column of the machine, the sine bar will react against roller 32 and through the racks 30 and 28 will impart a longitudinal sliding movement to element 23, successively presenting different longitudinally spaced transverse configurations of the pattern 24 in underlying relation to the path of transverse movement of the tracer finger 21.

It will, of course, be understood that if the work piece 27 and the pattern element 25 were both carried by the table or were mounted for equal transverse movements with respect to the machine that the form reproduced in the work would be identical with that of the pattern. This is the manner in which dies have been conventionally reproduced in the past. This manner of operation, however, has the disadvantage that for each individual configuration desired on a work piece or series of work pieces a pattern must first be accurately produced to the exact desired configuration, and this is a matter of appreciable expense when but one or two parts are to be produced and has the additional disadvantage of requiring large storage space for various pattern elements when a machine is to be used for production of a multiplicity of different configurations. As distinguished from the foregoing, by utilization of the present invention, a conventional cone configuration, for example, may be formed in the pattern which may have a variant of one inch in diameter for each of the major indicia on the die scale 39, which may involve a longitudinal spacing of an inch. If it is desired to reproduce a die or work piece having a taper groove 12" long but varying uniformly from a minor diameter of 1" to a major diameter of 2", it is merely necessary to set the sine bar 33 in accordance with the indicia at 40 for a taper of one inch to the foot. As the table and work piece are translated the bar will react against roller 32 to effect the necessary 1" transverse movement of pattern slide 23 and pattern 24 for the 12" movement of the work table.

It will be understood that if a groove of this dimension is to be produced, this may be effected by direct linear shifting of the table. If, however, a frustro-conical or like configuration is to be produced in the work this can most advantageously be performed by successive slight incremental longitudinal adjustments of the table with an intermediate transverse or in and out shifting of the ram or slide 13, causing the tracer to traverse the pattern and the cutter to traverse the work at each point of adjustment. While such adjustments may be manually effected if desired, I have found it advantageous if the complete control is automatic so that there is an incremental adjustment between each forward or backward movement of the ram 13 and cutter. In this manner, the entire work piece may be readily automatically produced.

A hydraulic control of the machine for this purpose has been diagrammatically illustrated in Figure 5. In this figure, there has been shown a reservoir 41 from which hydraulic actuating medium is forced by pump 42 into pressure conduit 43, the maximum pressure being determined by relief valve 44.

Secured to the slide 13 is rod 45 carrying piston 46 disposed in cylinder 47 which is secured to and movable with the head 15. A pair of conduits 48 and 49 are connected with opposite ends of the cylinder and are selectively couplable with pressure conduit 43 or alternatively with one of the branches of the exhaust conduit 50, depending on the position of spool 51 of tracer valve 52. In the position shown spool 51 is substantially blocking inlet 43 so that the cylinder 47, and thus the tool carrying the head, are locked against movement. Deflection of tracer finger 21 either laterally or axially will produce an upward movement of the valve, coupling pressure to conduit 48 for correspondingly shifting the head, while downward movement of the finger will couple this pressure with 49. In the intermediate position shown in Figure 5 and under ordinary slight deflections of the tracer and valve from that position pressure will be additionally connected from conduit 43 by way of valve groove 53 to conduit 54 centrally connected to valve bushing 55 and thence by way of valve groove 56 to conduit 57 extending into the reversing valve casing 58 where it is selectively couplable depending upon the rotated position of valve 59 with either conduit 60 or conduit 61 which extend to motor 62. Opposite coupling of 60 or 61 with pressure conduit 57 will cause rotation of this motor in one direction or the other, the opposite conduit being connected by the valve discharge conduit 63.

It will thus be seen that with the tracer in normal operative position, motor 62 will be continuously operated and serve to rotate screw 64 carried by the column to impart movement to the shifter 65 for the reversing valve 66 which determines the introduction of pressure into one end or the other of the hydraulic cylinder 67 carried by the cross slide or ram. This pressure reacts on piston 68 fixed to the column section 12. Movement of the valve in one direction or the other will therefor cause corresponding movement of the cylinder 67 and coupled ram in a continuous manner.

A similar type of mechanism is shown at the upper portion of Figure 5 comprising a piston 69 fixed to the bed on which moves cylinder 70 carried by the table. A valve 71 controls the admission of pressure from 43a to one end or the other of this cylinder to effect movement of same while the opposite end is connected through the valve 71 to the exhaust or return conduit 72. This valve is shiftable by yoke 73 operated by nut 74 on screw 75, which may be manually actuated in one direction or the other as by pilot wheel 17. Alternatively, the screw may be given a step by step rotative movement by means of the gear train 76 terminating in ratchet 77 engaged by pawl 78 hydraulically actuable in an operative direction by piston 79. A reverser 80 determines the direction of rotation of the screw effectable by the pawl.

To effect simultaneously reversal of direction of movement of the ram and an incremental longitudinal advance of the table, use is made of the valve 81 having a projecting end actuable by adjustable dogs 82 mounted on the vertically reciprocable head. In Figure 5, these have been diagrammatically shown as immediately adjacent the movable cylinder 47. When the head approaches its upper or lower limit of movement, valve 81 will be shifted to the left, shutting off conduit 72 and coupling pressure line 43a with control conduit 83. This is directly connected to the small piston 84 at the left end of the valve 86 which has groove 56 normally coupling 54 to 57. When pressure is introduced into 83 this will overcome the force of valve spring 87, moving the valve to the right when 57 will be temporarily connected by 50a to reservoir, releasing the pressure in 88 which urges the endwise slidable rotatable reversing valve 59 to the left. The pressure will then react through the choke or resistance coil 89 through 90—91 against the piston end of the valve, hydraulically moving the reversing valve toward the right. As this action takes place the pin 92 riding in angled slot 93 of the reversing valve will cause a partial rotation of the valve reversing the connections between 57—63 and 60—61. When the valve reaches its right hand position the pin 92 will then be in the axial extending slot 94 and at this time the conduit 50b normally connected to valve 53 through cannelure 95 and conduit 96 will be shut off and pressure from conduit 43b will be connected through the cannelure 95 to 96. As this pressure reacts on the larger piston area of the valve 86, although pressure now exists in both 43a and 96, the pressure in 96 plus the force of spring 87 will be controlling and the valve member 86 will be moved to the left, reestablishing the pressure connection between 54 and 57 for actuation of screw 64 and thus the ram or cross slide in the opposite direction. Simultaneously, this pressure will flow through conduit 88 to react on the reversing valve, tending to shift the same to the left. The combined urge of spring 97 and pressure introduced through 88 will shift the reversing valve to the left, pin 92 being guided in the axially extending slot 94 which holds the reversing valve in its newly reversed position when the ram will start traveling in the opposite direction. When the tracer in following the contour of the pattern causes a downward feeding movement of the cutter head dog 82 will be moved out of engagement with valve 81 which will then recouple the control circuit 83 to reservoir line 72, disconnecting any pressure effected from the pawl piston 79 which is then retracted ready for another actuation, from the cross slide locking valve 55 and from the conduit 91 to the reversing valve, when the parts will again make a cross stroke for operation in a new plane.

It will be noted an adjusting screw 98 has been provided to determine the amount of incremental longitudinal feed of the table effective for each stroke of the pawl. It will further be noted that upon any accentuated overdeflection or underdeflection of the tracer finger 21 the valve element 52 controlled thereby will accentuate the reaction of up or down movement of the tool carrying head and at the same time shut off the supply of hydraulic actuating medium to the ram or cross slide, stopping its movement until the tracer and pattern are again in proper sensitive control relationship.

From the foregoing description taken in connection with the accompanying drawings it will be noted that there has been provided an improved machine in which a sensitive tracer control mechanism determines the up and down or feeding and retracting movement of the tool with respect to the work, and in which the tool (or alternatively the work) may be given a forward and back or traversing movement with respect to the work in one plane, which plane remains constant, and that the tracer is correspondingly moved in a parallel constant plane with respect to the controlling pattern. It will further be noted that means have been provided whereby the table or work support may be advanced either continuous or by fine incremental transverse adjustments with respect to the planes of the tracer and cutter so that either continuous longitudinal tooling of the work or automatic indexing or slight advance after each transverse tooling operation may be effected. Special attention is invited to the fact that in the present mechanism, while the pattern may be left stationary, if desired, and is basically unaffected by the relative movements of work and tool, that means have been provided for effecting a proportional variation in the position of the pattern relative to the tracer as respects the variation in position of the work relative to the tool so that varying configurations of work may be accurately reproduced by the employment of a single pattern member. It will further be noted that by the provision of pattern retracting means, such as the spring 99 shown in Figure 4 and the employment of a contoured bar, such as 100 shown in Figure 6, in place of the pattern shown in Figure 1, back and forth movements of the pattern may be effected with respect to the tracer and thus desired increases and decreases in the diameter of a groove or dimension of a concave or convex formation in the work be effected merely by construction and employment of a suitably contoured bar such as 100 without the necessity of reproducing the entire dimensional configuration in a pattern individual for each of different workpieces.

What is claimed is:

1. A pattern position controlling mechanism for application to a tracer controlled machine tool of the type having a bed member, a work carrier table translatable on the bed member, and a tool carrier translatable transversely as respects the direction of movement of the work carrier, said device including a supporting bracket for attachment to the bed of the machine tool, said bracket being formed with a slideway, a pattern support mounted in said slideway for movement relative to the bracket, a rack and pinion mechanism carried by the bracket and coupled with the pattern support for determining the movement thereof, said rack and pinion mechanism including a follower element, a cam member mountable on the table in underlying relation to the follower portion of the rack and pinion mechanism for translation with the table, whereby said cam member will react through the follower and rack and pinion mechanism on the pattern support to determine positionings thereof in accordance with the movement imparted to the table.

2. A pattern position controlling mechanism for application to a tracer controlled machine tool of the type having a bed member, a work carrier table translatable on the bed member, and a tool carrier translatable transversely as respects the direction of movement of the work carrier, said device including a supporting bracket for attachment to the bed of the machine tool, said bracket being formed with a slideway, a pattern support mounted in said slideway for movement relative to the bracket, a rack and pinion mechanism carried by the bracket and coupled with the pattern support for determining the movement thereof, said rack and pinion mechanism including a follower element, a first bracket member attachable to the table, a control bar pivoted to the bracket member and adapted to underlie the follower of the rack and pinion mechanism, and means to secure the bar in angularly adjusted position with respect to the table whereby the camming reaction of the bar on the rack and pinion mechanism to adjust the slide may be varied for a given translatory movement of the table.

3. A pattern position controlling mechanism for application to a tracer controlled machine tool of the type having a bed member, a work carrier table translatable on the bed member, and a tool carrier translatable transversely as respects the direction of movement of the work carrier, said device including a supporting bracket for attachment to the bed of the machine tool, said bracket being formed with a slideway, a pattern support mounted in said slideway for movement relative to the bracket, a rack and pinion mechanism carried by the bracket and coupled with the pattern support for determining the movement thereof, said rack and pinion mechanism including a follower element, a first bracket member attachable to the table, a control bar pivoted to the bracket member and adapted to underlie the follower of the rack and pinion mechanism, and means to secure the bar in angularly adjusted position with respect to the table whereby the camming reaction of the bar on the rack and pinion mechanism to adjust the slide may be varied for a given translatory movement of the table, said means including a second bracket element for attachment to the table having an arcuate slot formed therein, said member being provided with graduations and the bar having an indicator for cooperation with the graduations to indicate the amount of angular adjustment of the bar with respect to the surface of the supporting table and a locking bolt engaged in the slot of the bracket and with the bar for locking the bar in selected angularly adjusted position.

ALFRED G. PLIMMER.

REFERENCES CITED

The following references are of record in the file of this patent:

UNITED STATES PATENTS

| Number | Name | Date |
|---|---|---|
| 1,013,343 | Warman | Jan. 2, 1912 |
| 1,435,408 | Magnuson | Nov. 14, 1922 |
| 1,521,001 | Bowman | Dec. 30, 1924 |
| 1,680,074 | Hamersveld | Aug. 7, 1928 |
| 1,971,121 | Shaw et al. | Aug. 21, 1934 |
| 2,068,889 | Roehm et al. | Jan. 26, 1937 |
| 2,394,671 | Duncan | Feb. 12, 1946 |